(12) United States Patent
Chang

(10) Patent No.: US 7,433,468 B2
(45) Date of Patent: *Oct. 7, 2008

(54) ELECTRICAL DEVICE FOR ADJUSTING THE ANGLE BETWEEN A TOP MODULE AND A BOTTOM MODULE

(75) Inventor: Ming-Shiung Chang, Taipei Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 811 days.

This patent is subject to a terminal disclaimer.

(21) Appl. No.: 10/905,424

(22) Filed: Jan. 4, 2005

(65) Prior Publication Data

US 2006/0034450 A1  Feb. 16, 2006

(30) Foreign Application Priority Data

Aug. 11, 2004 (TW) ............................. 93124080 A

(51) Int. Cl.
*H04M 1/00* (2006.01)
*H04M 9/00* (2006.01)

(52) U.S. Cl. ...................... 379/433.13; 379/433.11; 455/575.3

(58) Field of Classification Search ............ 379/433.13, 379/433.11, 433.01; 455/550.1, 575.1, 575.3, 455/90.3, 566, 575.4; 16/367, 338, 340; 361/679–683
See application file for complete search history.

(56) References Cited

U.S. PATENT DOCUMENTS

| | | | | | |
|---|---|---|---|---|---|
| 5,168,423 | A | * | 12/1992 | Ohgami et al. | 361/681 |
| 6,980,424 | B2 | * | 12/2005 | Kim et al. | 361/683 |
| 7,055,219 | B2 | * | 6/2006 | Shiba | 16/367 |
| 7,096,540 | B2 | * | 8/2006 | Watanabe et al. | 16/367 |
| 7,136,687 | B2 | * | 11/2006 | Chang | 455/575.3 |
| 7,327,561 | B2 | * | 2/2008 | Chen | 361/681 |
| 2002/0167789 | A1 | * | 11/2002 | Novin et al. | 361/681 |
| 2004/0090740 | A1 | * | 5/2004 | Tseng et al. | 361/683 |
| 2005/0207104 | A1 | * | 9/2005 | Love | 361/683 |

* cited by examiner

*Primary Examiner*—Curtis Kuntz
*Assistant Examiner*—Phylesha L Dabney
(74) *Attorney, Agent, or Firm*—Steven M. Reiss

(57) ABSTRACT

An electrical device includes a top module having a display panel for displaying image, a bottom module having a plurality of buttons for controlling the operation of the electrical device, a base fixed on the bottom module, a first pivot extended out of the base, a rotation pedestal pivotably installed on the first pivot, a second pivot installed on the rotation pedestal having a protruding member, the top module being pivotably installed on the second pivot, a slidable housing slidably installed on the rotation pedestal having a block for propping up the protruding member while the top module rotates a predetermined angle around the second pivot so as to keep the predetermined angle between the top module and the bottom module, and a trace formed on the base for allowing the slidable housing moving along the trace.

9 Claims, 10 Drawing Sheets

ELECTRICAL DEVICE FOR ADJUSTING THE ANGLE BETWEEN A TOP MODULE AND A BOTTOM MODULE

BACKGROUND OF INVENTION

1. Field of the Invention

The present invention relates to an electrical device, and more specifically, to an electrical device that forms a specific angle between a top module and a bottom module as the top module is unfolded.

2. Description of the Prior Art

With the popularization of convenient mobile phone devices for routine communication among people in the modern information society, people are able to exchange information, sharing experiences and communicating with each other anywhere and anytime. Conventional mobile phones have integrated more and more functions, such as listening to broadcasts, playing games, taking photos, and receiving electronic mail and SMS messages. In other words, mobile phones are not just communication tools but also portable electronic devices with multiple functions.

Please refer to FIG. 1 with reference to FIG. 2. FIG. 1 is a diagram of the mobile phone 10 according to prior art. FIG. 2 shows the top module 12 of the mobile phone 10 depicted in FIG. 1 rotated by 90 degrees. The mobile phone 10 contains a top module 12 having a display panel 11 for displaying images, a bottom module 14 having a plurality of buttons 18 for controlling the operation of the mobile phone 16, and a connection device 16 for rotatably unfolding the top module 12 and the bottom module 14 by the angle of 180 degrees between the top module 12 and the bottom module 14 as shown in FIG. 1. Because the aspect ratio of length to width for images displayed by the display panel 11 in the condition which FIG. 1 illustrates is 16:9 (or 4:3), that is, the width is narrower, it is desirable to be able to rotate the top module 12 to the orientation which FIG. 2 illustrates, so that the aspect ratio of length to width for images displayed by the display panel 11 is 9:16 (or 3:4). It is more suitable for a user to read text, for example electronic mail, in such a display image ratio. It is not ergonomically suitable for a mobile phone to have an included angle of 180 degrees between the top module 12 and the bottom module 14. For that reason, it is desirable to improve the mobile phone.

SUMMARY OF INVENTION

It is therefore a primary objective of the claimed invention to provide an electrical device that not only allows the top module to rotate relative to the bottom module around two different axes, but also to set the included angle between the top module and the bottom module to be around 160 degrees to suit the ergonomics of a mobile phone as the top module is lifted.

According to the claimed invention, an electrical device includes a top module having a display panel for displaying an image, a bottom module having a plurality of buttons for controlling the operation of the electrical device, a base affixed to the bottom module, a first pivot extended out of the base, a rotation pedestal pivotably installed on the first pivot, a second pivot installed on the rotation pedestal having a protruding member, the top module being pivotably installed on the second pivot, a slidable housing slidably installed on the rotation pedestal having a block for stopping the protruding member after the top module has rotated around the second pivot by a predetermined angle so as to keep the predetermined angle between the top module and the bottom module, and a trace formed on the base for allowing the slidable housing moving along the trace.

It is an advantage of the claimed invention that the included angle between the top module and the bottom module can be either 180 degrees or 160 degrees to conform to ergonomic needs as the top module is lifted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
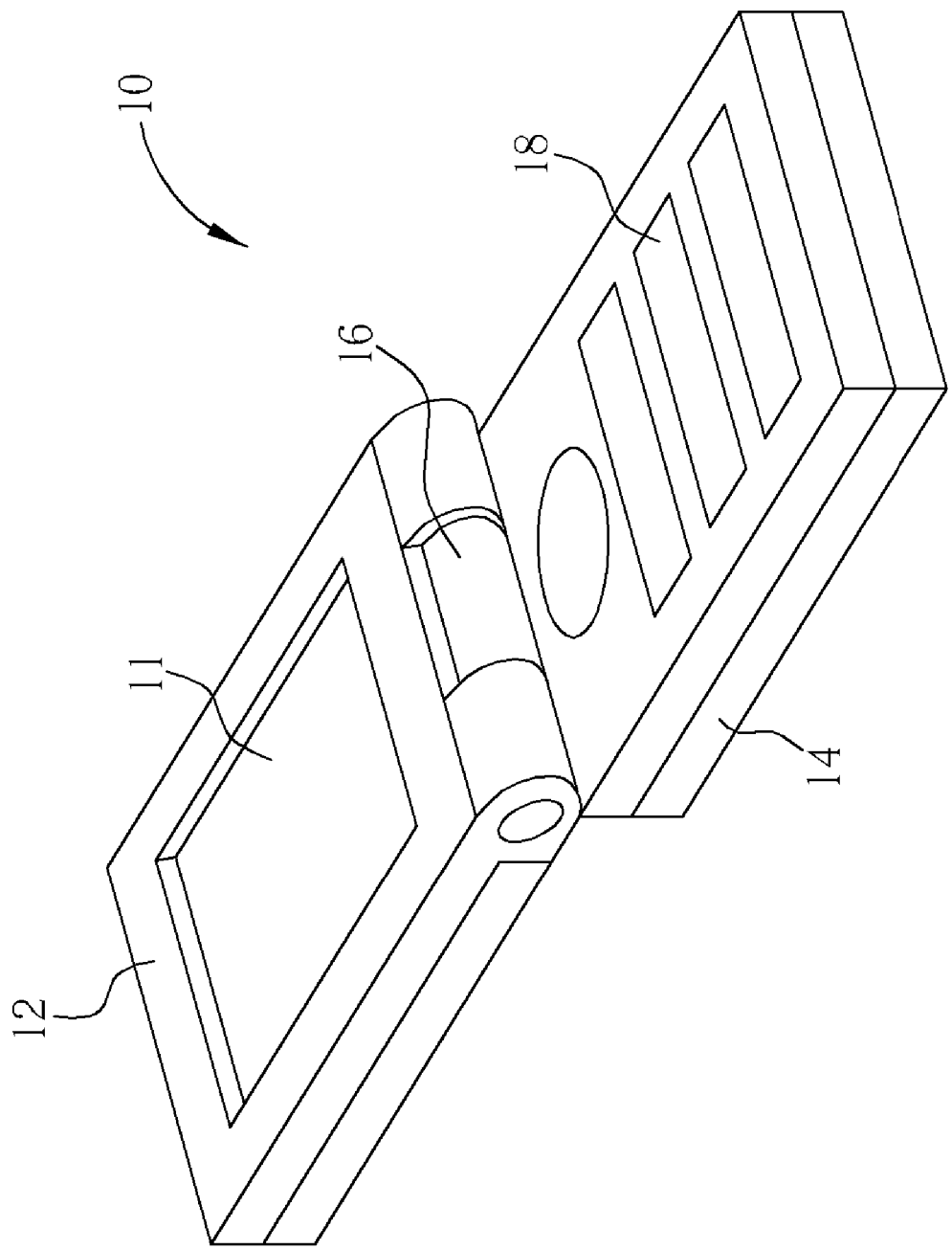
FIG. 1 is a diagram of a mobile phone according to the prior art.
Figure 2:
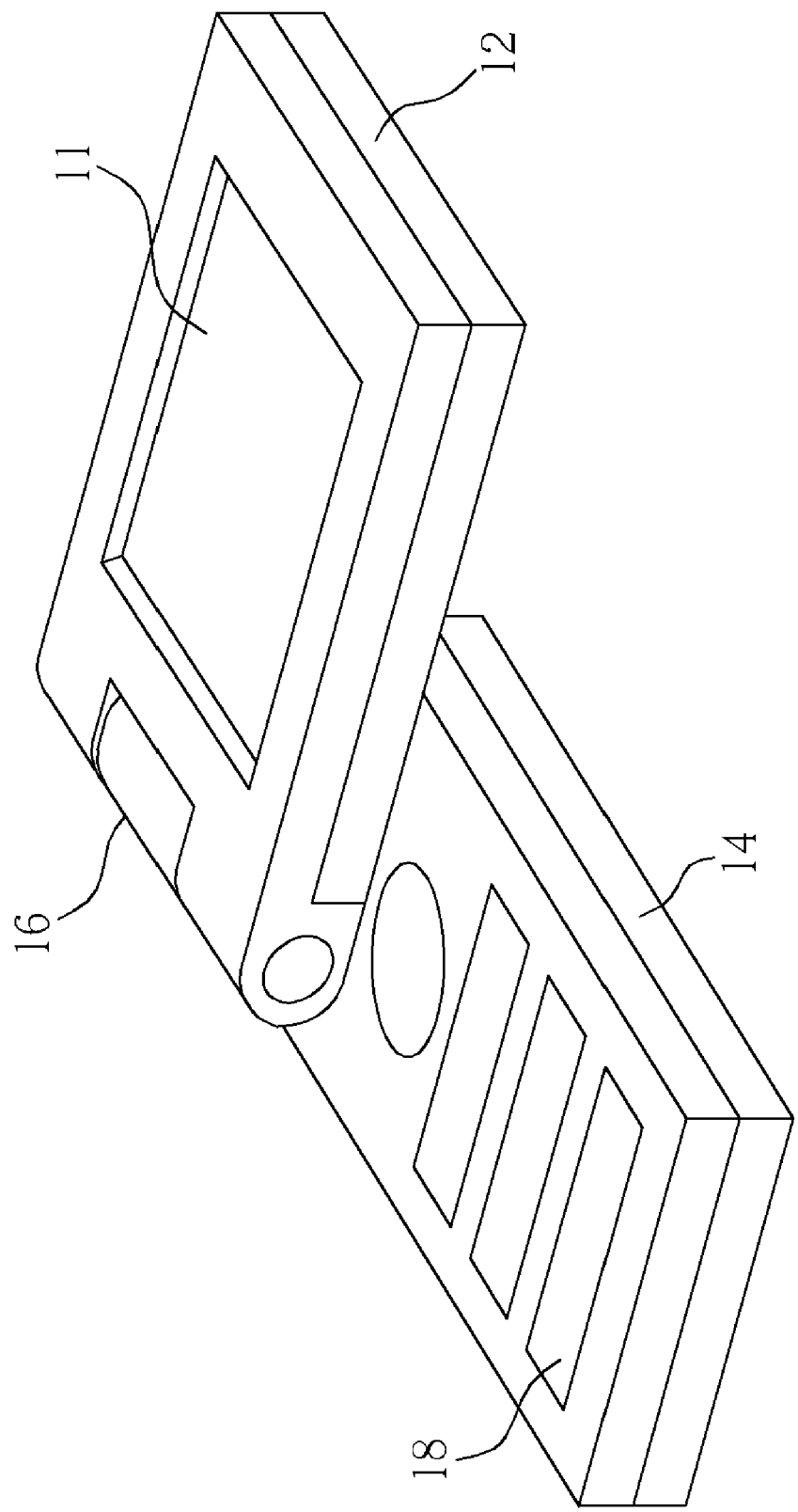
FIG. 2 shows the top module of the mobile phone depicted in FIG. 1 rotated by 90 degrees.
Figure 3:
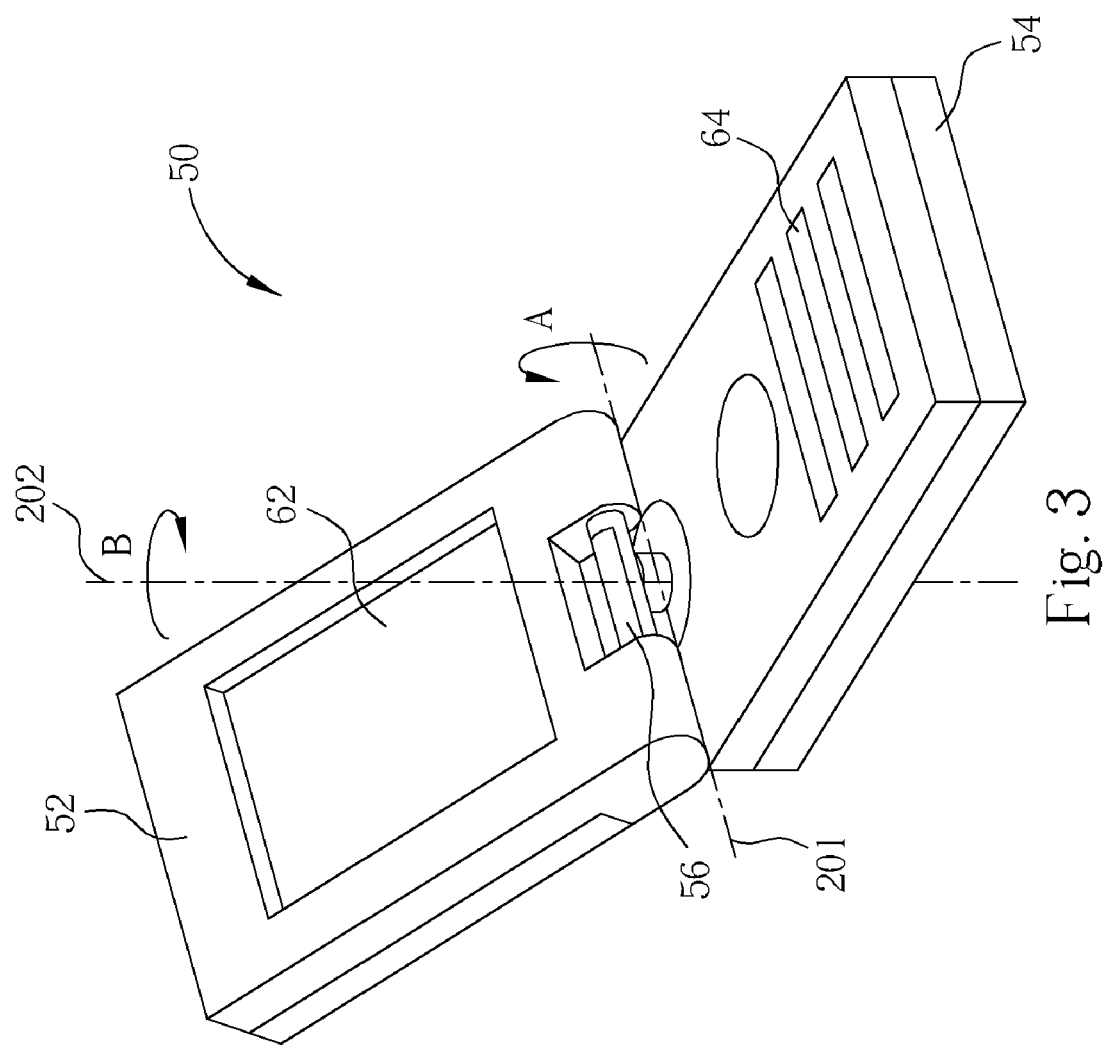
FIG. 3 shows a mobile phone according to the present invention.
Figure 4:
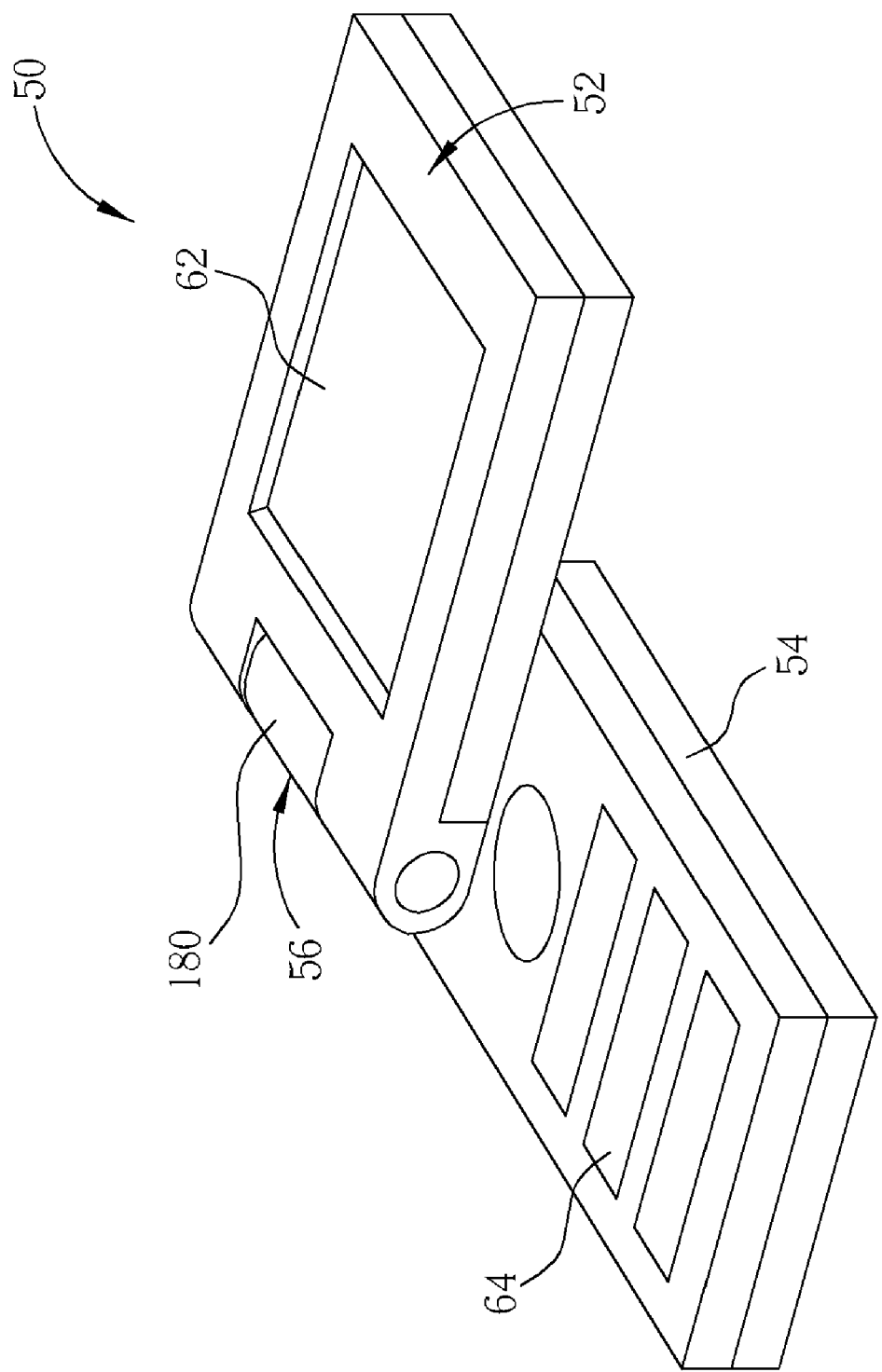
FIG. 4 is a diagram showing the top module of the mobile phone rotated 90 degrees along the arrow B.

Please refer to FIGS. 3 and 4. FIG. 3 shows a mobile phone 50 according to the present invention. FIG. 4 is a diagram showing the top module 52 of the mobile phone 50 rotated 90 degrees along the arrow B. The mobile phone 50 comprises a top module 52 having a display panel 62 for displaying images, a bottom module 54 having a plurality of buttons 64 for controlling the operation of the mobile phone 50, and a connection device 56 for coupling the top module 52 to the bottom module 54. The included angle between the top module 52 and the bottom module 54 is 160 degrees, when the top module 52 rotates in the direction of arrow A around the first axis 201 shown in FIG. 3. Next, the top module 52 rotates 90 degrees around the second axis 202 in the direction of arrow B as shown in FIG. 4. The first axis 201 is perpendicular to the second axis 202. The mobile phone 50 further comprises a pivot protection cover 180 for enclosing the components in the connection device 56 to protect the components from dirt or outside damage and for aesthetic reasons. For simplicity, the pivot protection cover 180 is only shown in FIG. 4.

Figure 5:
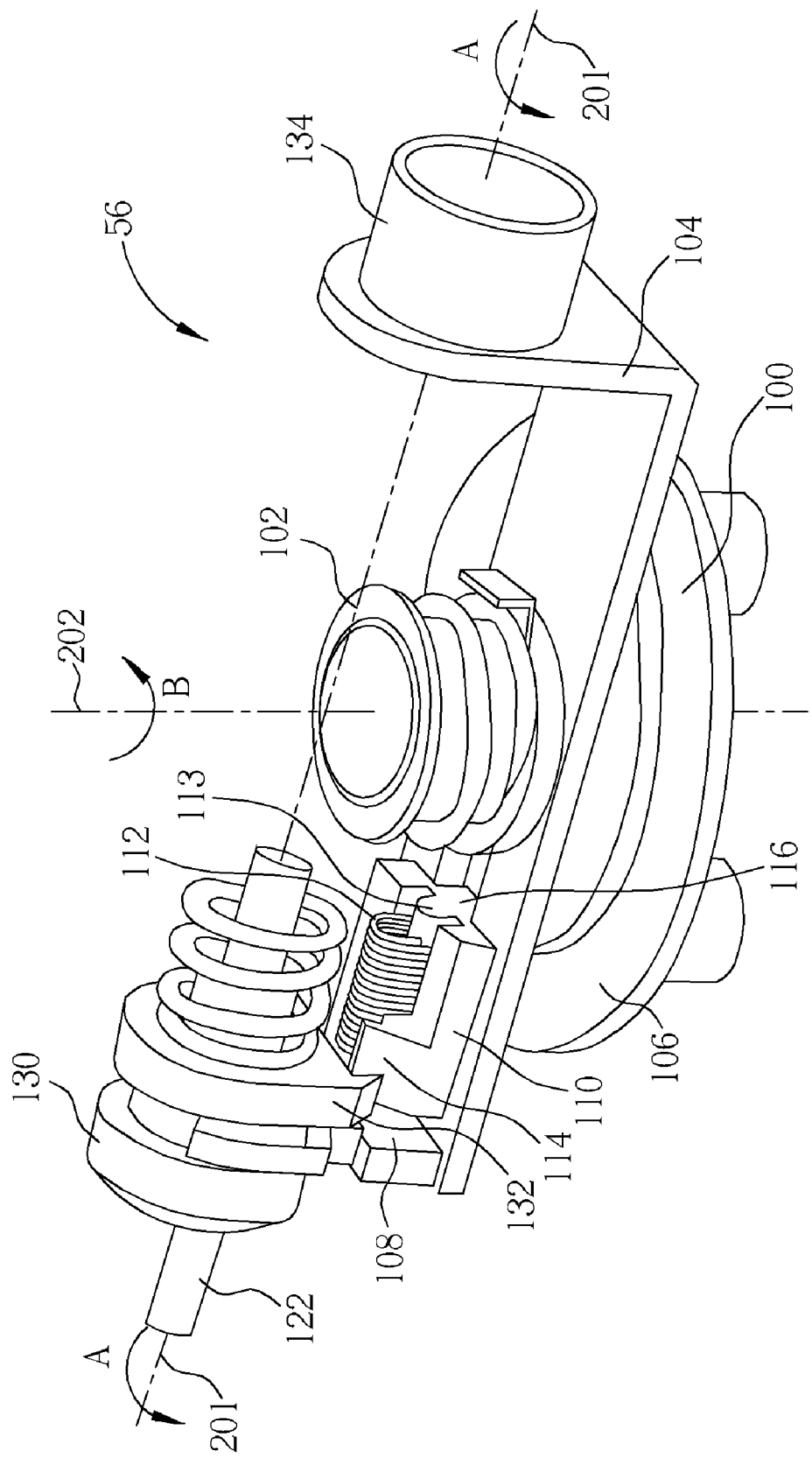
FIG. 5 is a diagram of the connection device depicted in FIG. 3.
Figure 6:
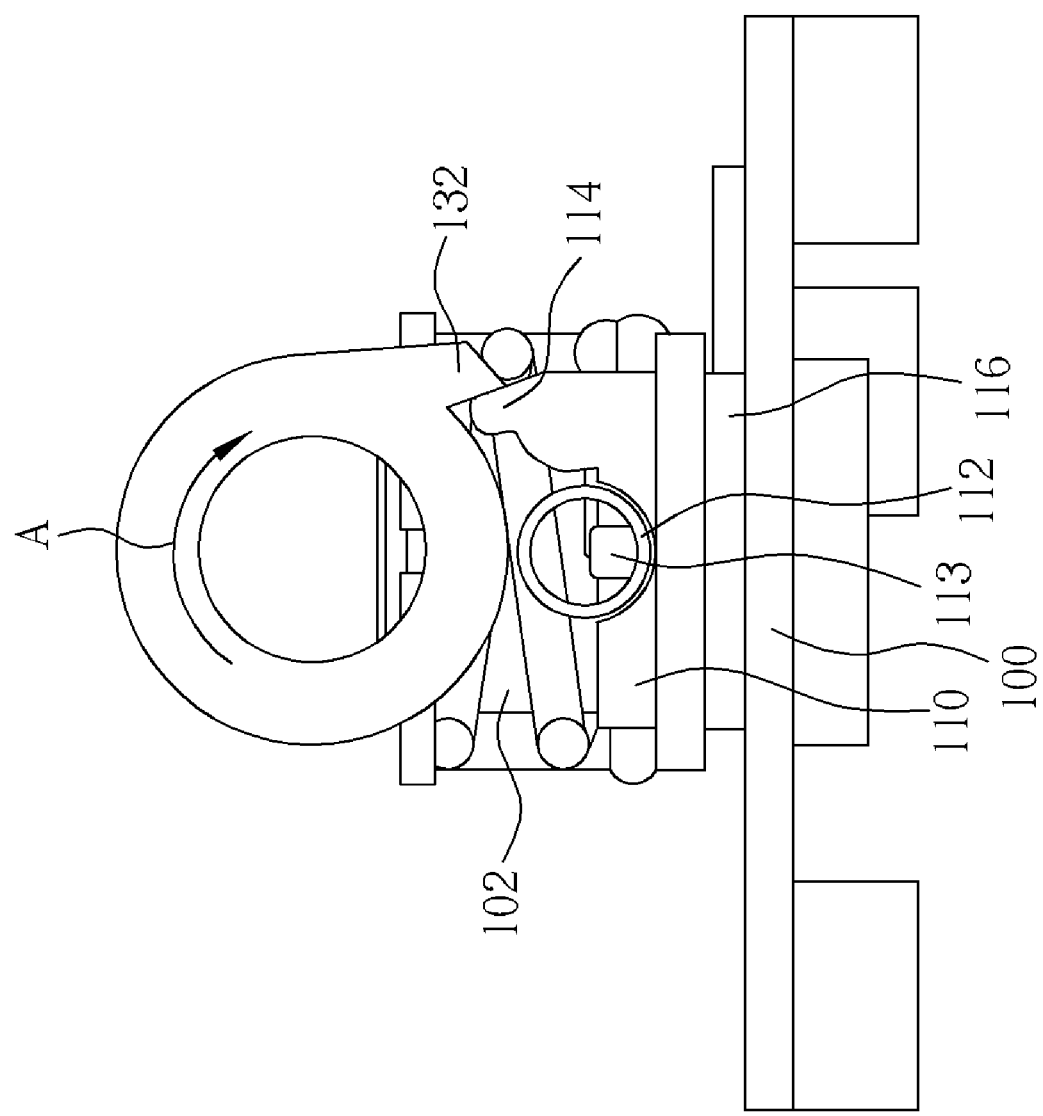
FIG. 6 is a side view of the connection device depicted in FIG. 5.

Please refer to FIG. 5 with reference to FIG. 6. FIG. 5 is a diagram of the connection device 56 depicted in FIG. 3. FIG. 6 is a side view of the connection device 56 depicted in FIG. 5. The connection device 56 comprises a base 100 having a first pivot 102 and a rotation pedestal 104. Because the rotation pedestal 104 is assembled with the first pivot 102, the rotation pedestal 104 is able to rotate around the first pivot 102 (i.e. the second axis 202) in the direction of arrow B. The rotation pedestal 104 has a slidable housing 110 and a second pivot 122 having a first buckle 130 and a protruding member 132. The first buckle 130 and the second buckle 134 not only couple the top module 52 (not shown in FIG. 5) to the bottom module 54, preventing the parts from disassembling, but also rotate around the first axis 201 in the direction of arrow A. The slidable housing 110 of the rotation pedestal 104 contains a flexible component 112, a protruding bump 113 and a block 114. The flexible component 112 can be a spring, one end of which is fixed to the side wall 108 of the rotation pedestal 104 and the other end of which is connected to the protruding bump 113. The bottom edge 116 of the block 114 is engaged in a trace 106. The protruding bump 113, the block 114 and the bottom edge 116 are formed monolithically. As the top module 52 rotates in the direction of arrow A, the protruding member 132 rotates with the top module 52 until stopped by the block 114. When fully unfolded, i.e. when stopped by the block 114, the included angle between the top module 52 and the bottom module 54 is substantially around 160 degrees (as shown in FIG. 3).

Figure 7:
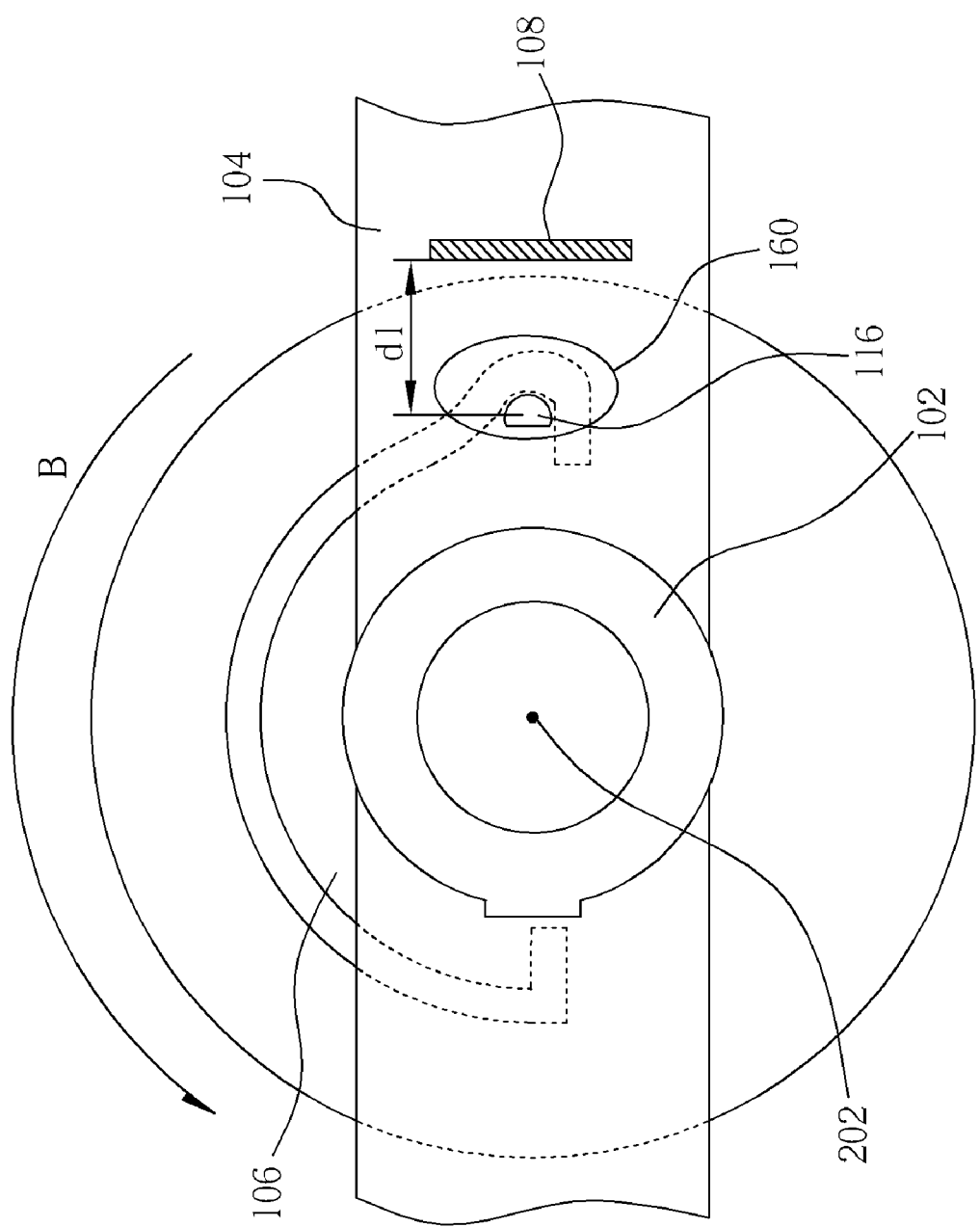
FIGS. 7 and 8 are diagrams of the relative position of the rotation pedestal and the trace.
Figure 8:
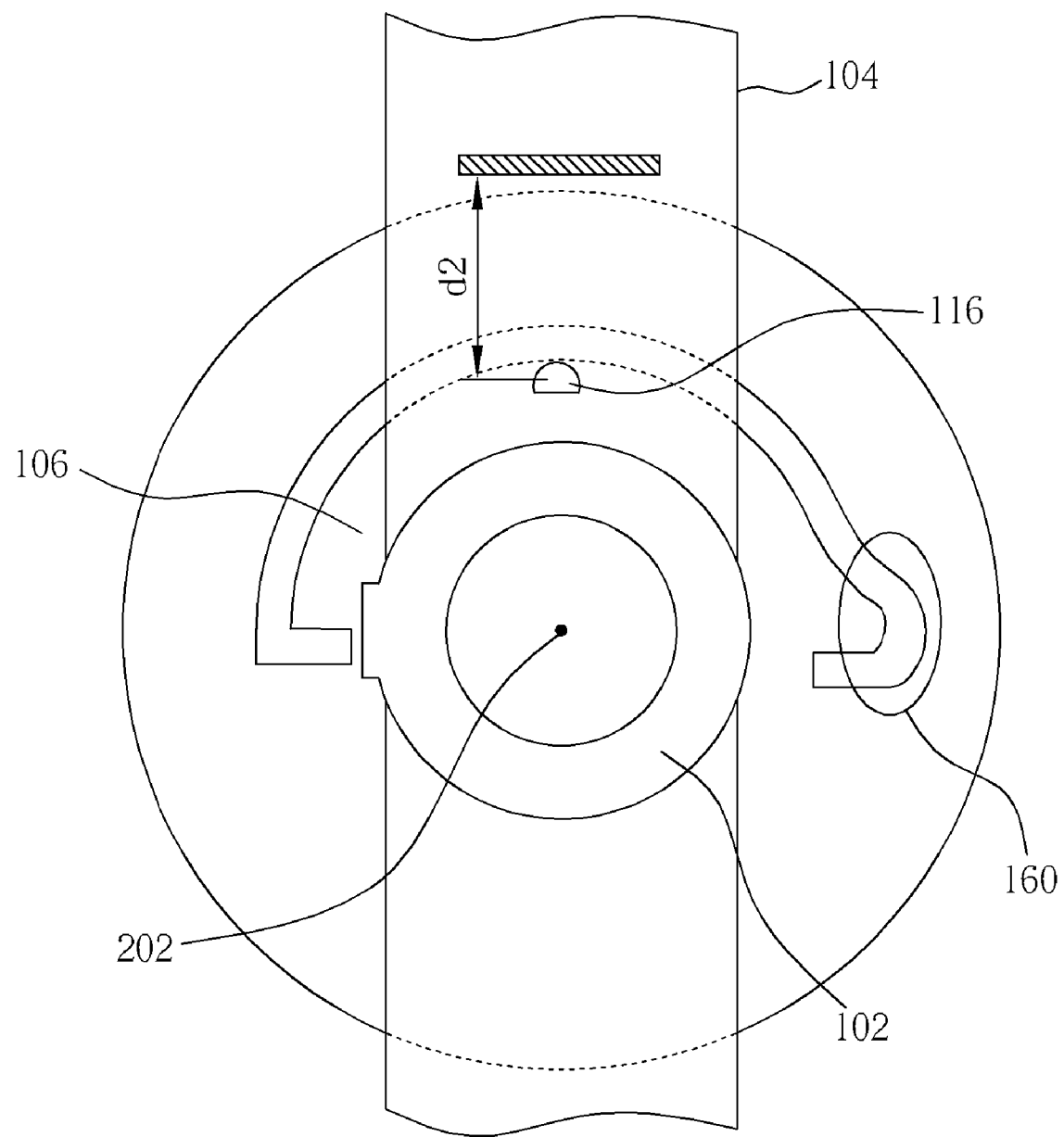
Figure 9:
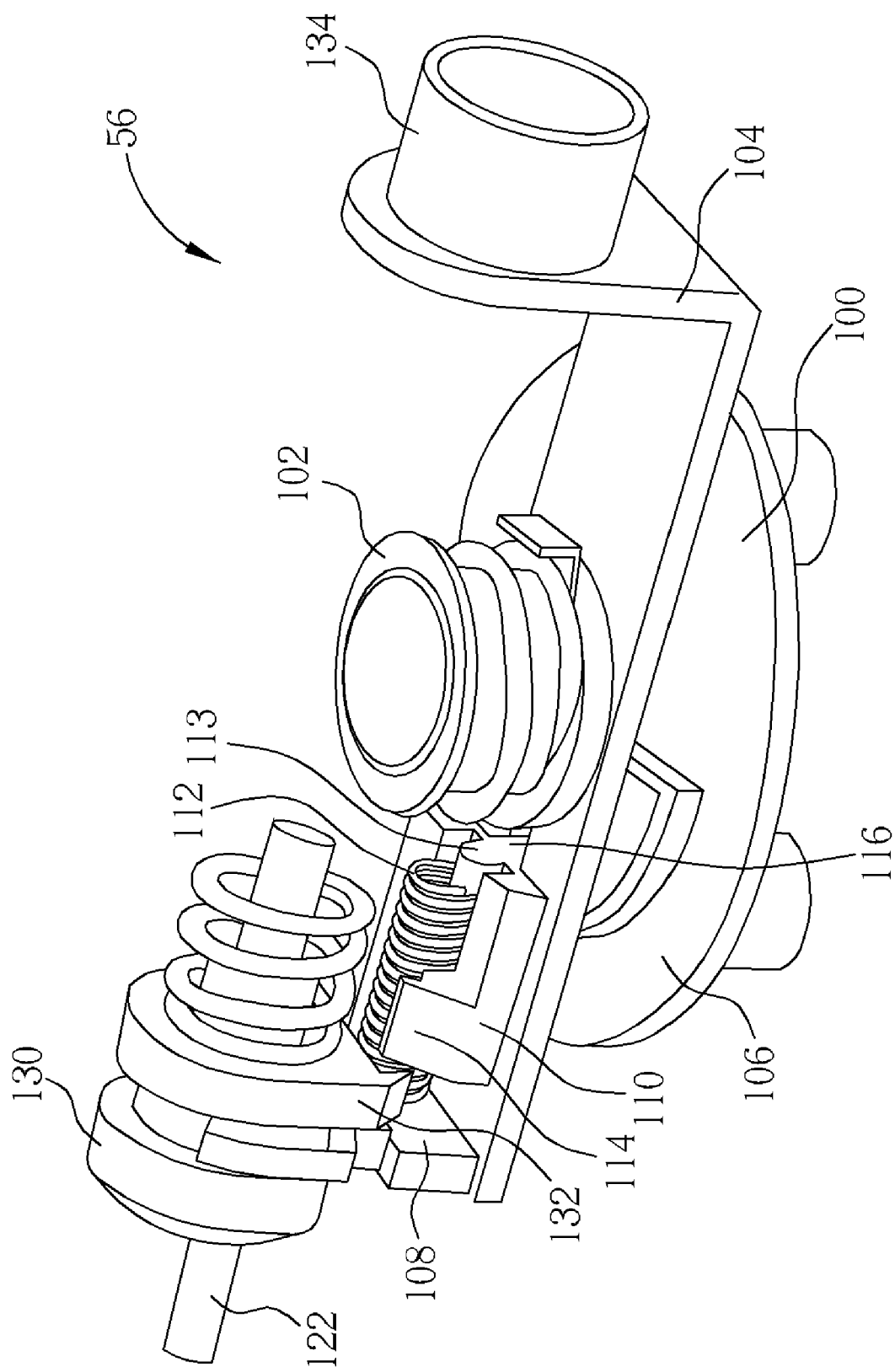
FIG. 9 is a diagram showing the rotation pedestal in FIG. 5 rotated 90 degrees around the arrow B illustrated in FIG. 5.

The top module 52 is able to rotate 90 degrees in the direction of arrow B after being fully unfolded (the condition in which FIG. 3 is shown). In order to instruct the relation of operation between each component in the connection device 56 clearly, please refer to FIGS. 7, 8, and 9. FIGS. 7 and 8 are diagrams of the relative position for the rotation pedestal 104 and the trace 106. FIG. 9 is a diagram showing the rotation pedestal 104 in FIG. 5 after rotating 90 degrees around the second axis 202 in the direction of the arrow B illustrated in FIG. 5. FIG. 7 illustrates the relative positions of the rotation pedestal 104, the bottom edge 116 of the slidable housing 110 and the trace 106 of the connection device 56 when the mobile phone 50 is fully unfolded around the first axis 201 as in FIG. 3, showing that the distance between the bottom edge 116 of the slidable housing 110 and the side wall 108 is d1. The relative positions of the rotation pedestal 104, the bottom edge 116 of the slidable housing 110 and the trace 106 are illustrated in FIG. 8 as the rotation pedestal 104 is rotated 90 degrees in the direction of arrow B around the second pivot (the illustration is drawn looking down the axis of the second pivot, which is perpendicular to the plane of the figure), showing that the distance between the bottom edge 116 of the slidable housing 110 and the side wall 108 is d2, where d2 is longer than d1. The bottom edge 116 of the slidable housing 110 will separate from the concave area 160 of the trace 106 and move along the trace 106 as the top module 52 is unfolded so that the whole slidable housing 110 will move with the bottom edge 116. Because the block 114 does not stop the protruding member 132 any longer, as shown in FIG. 9, the top module 52 and the bottom module 54 can be unfolded until the included angle between the top module 52 and the bottom module 54 is 180 degrees.

Figure 10:
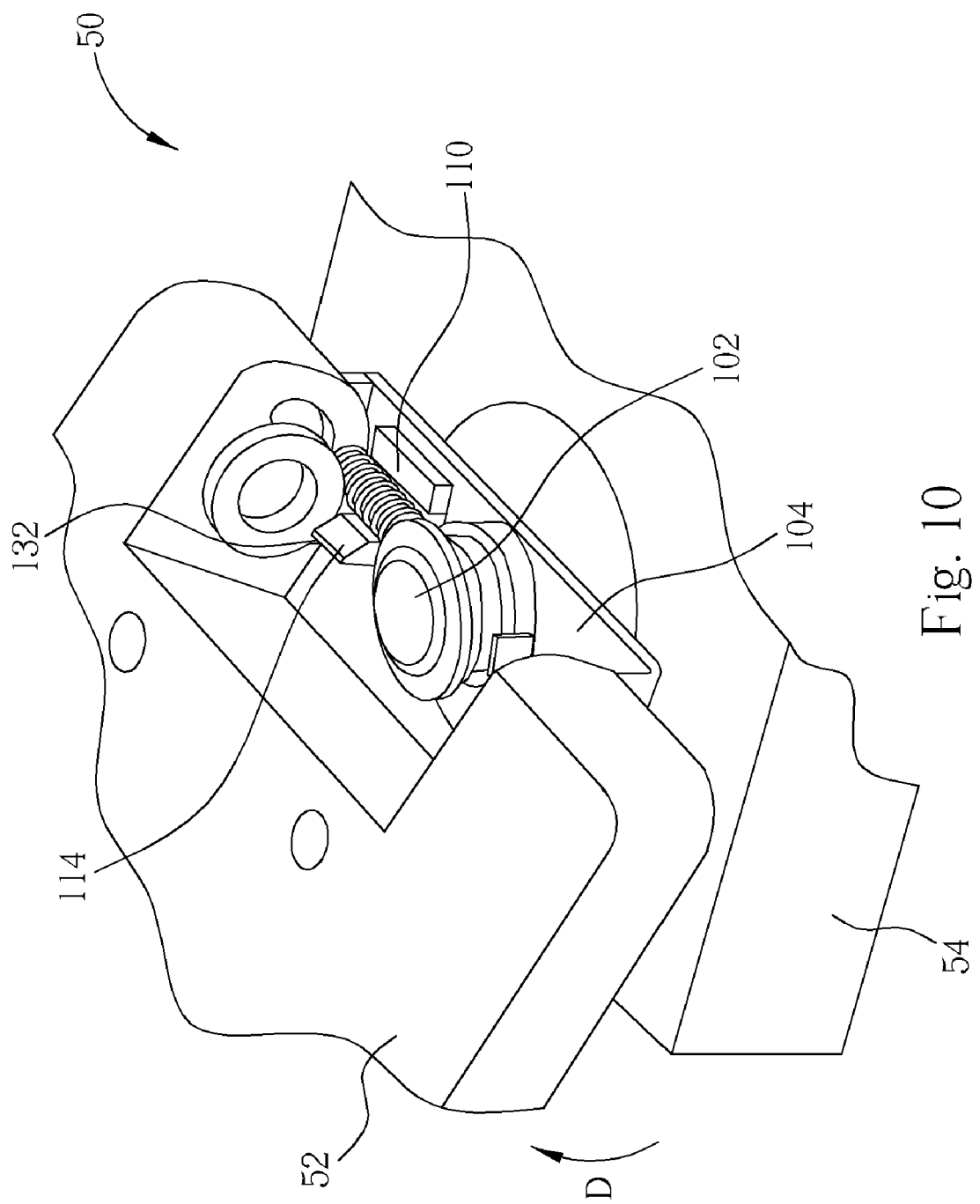
FIG. 10 is a diagram showing the rotation pedestal rotated back around the first pivot.

Please refer to FIGS. 7 and 10. FIG. 10 is a diagram showing the rotation pedestal 104 rotated back around the first pivot 102. As shown in FIG. 10, when the rotation pedestal 104 moves from the position shown in FIG. 8 to the position shown in FIG. 7, the flexible component 112 fixed to the side wall 108 of the rotation pedestal 104 will pull the rotation pedestal 110 back, but because the protruding member 132 stops the block 114, the bottom edge 116 of the slidable pedestal 110 formed monolithically with the block 114 is unable to turn back to the position of the concave area 160. By rotating the top module 52 in the direction of arrow D, the protruding member 132 will move with the top module 52 in the same direction, and the protruding member 132 will not stop the block 114 anymore. At this moment, the bottom edge 116 of the slidable housing 110 can return to the position of the concave area 160 by the force of the flexible component 112 so that the mobile phone 50 returns to the condition of FIG. 3.

Although this embodiment of the present invention uses mobile phones for purposes of illustration, the connection device 56 of the present invention is also applicable to other electronic devices such as a notebook computer.

Compared to the prior art, the connection device 56 of the present invention sets the included angle between the top module 52 and the bottom module 54 to be 160 degrees when the top module 52 is fully lifted, which is desirable for ergonomic reasons, rather than 180 degrees. In addition, the fully lifted top module can still be rotated to make the included angle between the top module 52 and the bottom module 54 be 180 degrees. In doing so, the user is capable of adjusting the included angle between the top module 52 and the bottom module 54 to 160 degrees when conversing using the mobile phone 50 of the present invention. If the user wants to take a photo with the mobile phone 50, the user is able to adjust the included angle between the top module 52 and the bottom module 54 to be 180 degrees, which conforms to the ergonomics to take a photo more naturally.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electrical device comprising:
    a top module comprising a display panel for displaying an image;
    a bottom module comprising a plurality of buttons for controlling the operation of the electrical device;
    a base affixed to the bottom module;
    a first pivot extended out of the base;
    a rotation pedestal pivotably installed on the first pivot;
    a second pivot installed on the rotation pedestal comprising a protruding member, the top module being pivotably installed on the second pivot;
    a slidable housing slidably installed on the rotation pedestal comprising a block for stopping the protruding member after the top module rotates around the second pivot by a predetermined angle so as to keep the predetermined angle between the top module and the bottom module; and
    a trace formed on the base for allowing the slidable housing to move along the trace.

2. The electrical device of claim 1 further comprising a flexible component, one end of which is connected to the slidable housing and the other end of which is affixed to the rotation pedestal, the flexible component being used for controlling the movement of the slidable housing based on the position of the slidable housing with respect to the trace.

3. The electrical device of claim 1, wherein the rotation pedestal turns on a first axis, the top module turns on a second axis, and the first axis is perpendicular to the second axis.

4. The electrical device of claim 1 wherein the specific angle is substantially 160 degrees.

5. The electrical device of claim 1 further comprising a pivot protection cover for enclosing the rotation pedestal and the base.

6. The electrical device of claim 1 wherein the protruding member rotates with the top module, as the top module rotates around the second pivot.

7. The electrical device of claim 1 wherein the flexible component is a spring.

8. The electrical device of claim 1 being a mobile phone.

9. The electrical device of claim 1 being a notebook computer.

* * * * *